Patented July 3, 1945

2,379,494

UNITED STATES PATENT OFFICE 2,379,494

COMPOSITION OF MATTER

Milton Orchin, Pittsburgh, Pa., and Lewis W. Butz, Beltsville, Md., assignors to the United States of America as represented by Claude R. Wickard, Secretary of Agriculture, and his successors in office No Drawing. Application May 5, 1944,
Serial No. 534,364

4 Claims. (Cl. 260—396)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to certain new compositions of matter which are useful as intermediates in the synthesis of polycyclic compounds.

We have found that 5-methoxy-2-methyl-1, 4-benzoquinone (methoxytoluquinone) and butadiene yield as a chief product the angle-methyl adduct, 2-methoxy-5-methyl-2,7-naphthitadiene-1, 4-dione, and that this compound can be hydrolyzed to the triketone enol, 5-methyl-7-naphthitene-1, 2, 4-trione enol. We have also found that this triketone enol can be prepared by reacting butadiene with 5-acetoxy-2-methyl-1,4-benzoquinone and extracting the product mixture with aqueous alkali.

The preparation of these angle-methyl compounds is illustrated by the following examples:

EXAMPLE I

*2-methoxy-5-methyl-2,7-napthitadiene-1,4-dione*

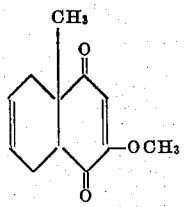

A mixture of 6.3 g. of 5-methoxy-2-methyl-1,4-benzoquinone, 20 cc. of absolute ethanol, and about 12 cc. of butadiene was sealed in a tube and heated at 100° C. for 65 hours. The tube was cooled in dry ice, opened, filtered, and the white granular product, 6.15 g. (73 percent yield), M. P. 87–92° C., was washed thoroughly with petroleum ether. Recrystallization from petroleum ether gave 4.75 g. (55.5 percent yield) of a product melting at 92–94.8° C., and 0.5 g. (5.8 percent yield) of less pure product melting at 90.5–93.5° C. Two more crystallizations from petroleum ether gave a product with a melting point of 94.5–95.5° C. Analysis of this product demonstrated the empiric composition $C_{12}H_{14}O_3$.

In another run the time of reaction was 48 hours, and only 1 g. of methoxytoluquinone was used. The precipitated product (880 mg.) was recrystallized from benzene-petroleum ether. Methoxytoluquinone, 195 m. g., M. P. and mixed M. P. 174–175.5° C., separated first; and then 368 mg. (27.1 percent yield) of 2-methoxy-5-methyl-2,7-naphthitadiene-1,4-dione was obtained.

EXAMPLE II 0.9 g. of 2-methoxy-5-methyl-2,7-naphthitadiene-1,4-dione, M. P. 93.5–94.5° C., and 3.5 cc. of concentrated hydrochloric acid were heated on a steam bath for 15 minutes. The resulting dark brown solution was extracted with ether, finally with the addition of solid sodium chloride. The ether extract was washed until neutral to Congo, filtered and dried. Evaporation of the ether and crystallization of the residue from carbon tetrachloride gave 0.487 g. (57 percent yield) of 5-methyl-7-naphthitene-1,2,4-trione enol, M. P. 172–173° C. This material had a pink color, but could be made colorless by warming with Norite in carbon tetrachloride.

EXAMPLE III

*5-methyl-7-naphthitene-1,2,4-trione enol*

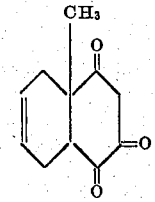

10 g. of 5-acetoxy-1,4-toluquinone and 6 g. of butadiene (2 moles) were heated in 25 cc. of absolute ethanol in a sealed tube at 75° C. for 68 hours. Evaporation of the ethanol and excess butadiene at reduced pressure gave 12.5 g. of residue, which was shaken with 8 g. of potassium hydroxide in 110 cc. of water for one hour. After removal of the neutral and unsaponified products with ether, the aqueous portion was set in an ice bath and normal hydrochloric acid was added, with stirring, until the mixture was just blue to Congo. Extraction with ether, finally with the addition of sodium sulfate, followed by drying and evaporation of the ether gave 10 to 11 g. of residue. This was extracted exhaustively with hot water, avoiding actual boiling. The straw-colored aqueous extract was cooled, and extracted thoroughly with ether, salting out with sodium sulfate. The ether solution dried, and the ether was evaporated to give 6.1 g. of crude 5-methyl-7-naphthitene-1,2,4-trione enol. Recrystallization from carbon tetrachloride yielded 3.5 g. of the trione enol, M. P.

173–175° C. The compound can also be recrystallized from benzene, benzene-petroleum ether, ether-petroleum ether, and ether, but a really satisfactory solvent has not been found. More of the product, about 0.3 g., was isolated by drying the hot water-insoluble tar and subliming at 0.1 mm. and 140° C. (bath temperature). For analysis, a sample was sublimed at 0.1 mm. and 130–140° C. (bath temperature) and the sublimate recrystallized from ether; M. P. 174–175° C. Analytical results corresponded to the empiric composition $C_{11}H_{12}O_3$.

The compound in ethanol gave a dark purple color with 0.15 percent ferric chloride in ethanol. In aqueous ethanol with phenolphthalein, 45.8 mg. required 1.85 cc. of 0.13-N sodium hydroxide.

Having thus described our invention, we claim:
1. 2-methoxy-5-methyl-2,7-nephthitadiene-1,4-dione.
2. 5-methyl-7-naphthitene-1,2,4-trione enol.
3. The process of producing 2-methoxy-5-methyl-2,7-naphthitadiene-1,4-dione which comprises reacting 5-methoxy-2-methyl-1,4-benzoquinone and butadiene.
4. The process which comprises reacting 5-methoxy-2-methyl-1,4-benzoquinone and butadiene, recovering the 2-methoxy-5-methyl-2,7-naphthitadiene-1,4-dione and hydrolyzing this product to obtain 5-methyl-7-naphthitene-1,2,4-trione enol.

MILTON ORCHIN.
LEWIS W. BUTZ.